(12) United States Patent
Arnold et al.

(10) Patent No.: US 11,438,239 B2
(45) Date of Patent: Sep. 6, 2022

(54) TAIL-BASED SPAN DATA SAMPLING

(71) Applicant: New Relic, Inc., San Francisco, CA (US)

(72) Inventors: Erika Arnold, Portland, OR (US); Michael LaSpina, Portland, OR (US); Todd West, Portland, OR (US)

(73) Assignee: New Relic, Inc., San Francisco, CA (US)

( * ) Notice: Subject to any disclaimer, the term of this patent is extended or adjusted under 35 U.S.C. 154(b) by 0 days.

(21) Appl. No.: 16/908,279

(22) Filed: Jun. 22, 2020

(65) Prior Publication Data

US 2021/0399953 A1 Dec. 23, 2021

(51) Int. Cl.
*H04L 12/24* (2006.01)
*H04L 12/26* (2006.01)
*H04L 41/14* (2022.01)
*H04L 43/02* (2022.01)
*H04L 43/10* (2022.01)

(52) U.S. Cl.
CPC .............. *H04L 41/14* (2013.01); *H04L 43/02* (2013.01); *H04L 43/10* (2013.01)

(58) Field of Classification Search
CPC .......... H04L 41/14; H04L 43/02; H04L 43/10
USPC ........................................................ 709/224
See application file for complete search history.

(56) References Cited

U.S. PATENT DOCUMENTS

| 9,634,920 | B1* | 4/2017 | Goldberg | ................ H04L 43/10 |
| 10,644,968 | B1* | 5/2020 | Ting | ..................... H04L 43/024 |
| 2005/0276388 | A1* | 12/2005 | Ethier | ..................... H04L 43/00 |
| | | | | 379/32.01 |
| 2011/0016207 | A1* | 1/2011 | Goulet | ................... G06Q 10/06 |
| | | | | 709/224 |
| 2013/0145015 | A1* | 6/2013 | Malloy | ............... G06F 11/3495 |
| | | | | 709/224 |
| 2014/0082118 | A1* | 3/2014 | Chan | ................... H04L 49/9094 |
| | | | | 709/212 |
| 2014/0164585 | A1* | 6/2014 | Shaw | .................. H04L 41/0654 |
| | | | | 709/223 |

(Continued)

OTHER PUBLICATIONS

Jeremy Castile, What You Need to Know About Distributed Tracing and Sampling, Apr. 27, 2020, URL retrieved: https://thenewstack.io/what-you-need-to-know-about-distributed-tracing-and-sampling/ (Year: 2020).*

(Continued)

*Primary Examiner* — Schquita D Goodwin
(74) *Attorney, Agent, or Firm* — Fenwick & West LLP

(57) ABSTRACT

A system provides for tail-based sampling of span data at the trace level. The system may include a circuitry, such as one or more servers, that execute applications, agents, and a trace manager. The agents generate span data of operations performed by the applications. The trace manager receives the span data from the agents, and groups the operations defined by the span data into traces. The trace manager determines a selected subset of the traces for span data sampling and an unselected subset of the traces excluded from the span data sampling by comparing one or more trace characteristics of the traces with one or more trace criteria. The trace manager discards unselected span data of the unselected subset of the traces and provide selected span data of the selected subset of the traces to a monitoring system via a network.

12 Claims, 5 Drawing Sheets

(56) References Cited

U.S. PATENT DOCUMENTS

| | | | |
|---|---|---|---|
| 2016/0112822 A1* | 4/2016 | Giral | H04L 41/0823 |
| | | | 455/414.1 |
| 2020/0177407 A1* | 6/2020 | Nakamura | G10L 15/22 |
| 2020/0257680 A1* | 8/2020 | Danyi | G06F 16/245 |
| 2021/0026646 A1* | 1/2021 | Jha | G06F 9/541 |
| 2021/0105199 A1* | 4/2021 | C H | H04L 45/42 |
| 2021/0248023 A1* | 8/2021 | Brown | G06F 11/0709 |

OTHER PUBLICATIONS

Katy Farmer, The truth about sampling and distributed tracing, Mar. 17, 2020, URL retrieved: https://lightstep.com/blog/the-truth-about-sampling-and-distributed-tracing/ (Year: 2020).*

* cited by examiner

TAIL-BASED SPAN DATA SAMPLING

BACKGROUND

The disclosure generally relates to monitoring computers, and in particular to managing the collection of spans and traces of computing systems.

When a (e.g., distributed) computing system handles a request or performs some other type of operation, a trace of the operation can be generated to monitor performance of the operation. A trace may include multiple spans, such as a root span and one or more child spans. Each span represents a transaction or unit of work. In a distributed computing system, each span may be handled by a different component that provides a service. The computing system may execute many operations, thus resulting in a large volume of span data being collected by agents of the computing system. To reduce the volume of collected span data, the agents perform a head-based sampling that includes randomly selecting a subset of the generated span data and discarding unselected span data. It is desirable to more intelligently sample span data of interest for monitoring performance of computing systems.

SUMMARY

Embodiments relate to tail-based sampling of span data at the trace level. Some embodiments include a method. The method includes, by a circuitry: receiving, from agents of a host system, span data of operations performed by applications executed by the host system; grouping the operations defined by the span data into traces; determining a selected subset of the traces for span data sampling and an unselected subset of the traces excluded from the span data sampling by comparing one or more trace characteristics of the traces with one or more trace criteria; and discarding unselected span data of the unselected subset of the traces.

Some embodiments include a system. The system includes a circuitry configured to execute applications, agents, and a trace manager. The agents generate span data of operations performed by the applications. The trace manager receives the span data from the agents, and groups the operations defined by the span data into traces. The trace manager determines a selected subset of the traces for span data sampling and an unselected subset of the traces excluded from the span data sampling by comparing one or more trace characteristics of the traces with one or more trace criteria. The trace manager discards unselected span data of the unselected subset of the traces and provide selected span data of the selected subset of the traces to a monitoring system via a network.

Some embodiments include a non-transitory computer readable storage medium having instructions encoded thereon that, when executed by a processor, configures the processor to: receive, from agents of a host system, span data of operations performed by applications executed by the host system; group the operations defined by the span data into traces; determine a selected subset of the traces for span data sampling and an unselected subset of the traces excluded from the span data sampling by comparing one or more trace characteristics of the traces with one or more trace criteria; and discarding unselected span data of the unselected subset of the traces.

DETAILED DESCRIPTION

Figure 1:
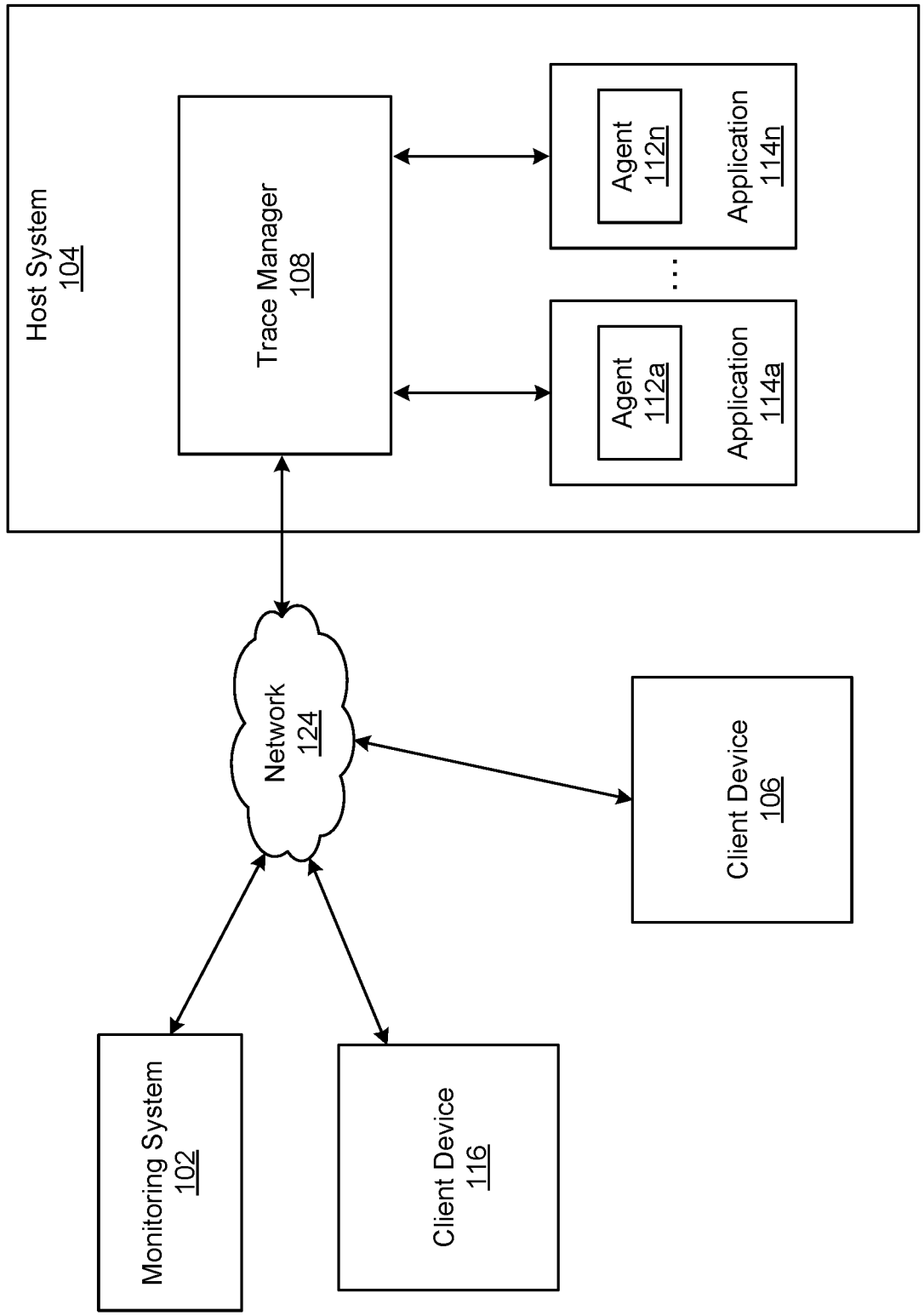
FIG. 1 is a block diagram of a system environment for monitoring performance of a host system, according to one embodiment.

FIG. 1 is a block diagram of a system environment for monitoring performance of a host system, according to one embodiment. The environment includes a monitoring system 102 (discussed in reference to FIG. 2), a host system 104, client devices 106 and 116, and a network 124. The monitoring system 102, host system 104, and client devices 106 and 116 may communicate over the network 124, which may include a wide area network (e.g., the Internet).

The host system 104 may include circuitry (e.g., one or more servers) that executes the components of the host system 104. For example, the host system 104 may be a distributed system with different components (e.g., servers, virtual machines, physical machines, etc.) executing the applications 114a through 114n (also referred to as application 114), agents 112a through 112n (also referred to as agent 112), and a trace manager 108. In some embodiments, the host system 104 is a cloud computing system.

Each application 114a through 114n includes a respective agent 112a through 112n that collects data regarding the application. The applications 114a through 114n may include various types of services, such as web services, registration services, and account services. Each agent 112 generates span data of the operations performed by an application 114. An operation is a unit of work of an application 114, and may also be referred to as a span. Each operation may include references to other operations and multiple connected operations may be grouped into a trace. A trace includes a group of connected operations (e.g., via reference) that define a complete transaction (e.g., the life of a request) through the host system 104. In some embodiments, each instance of span data defines an operation and may include an operation name, a trace identifier indicating a trace to which the operation belongs, a span identifier that uniquely identifies the operation, a start timestamp for the operation, finish timestamp for the operation, among other things. Each agent 112 may collect span data from a respective application 114, and provide the span data to the trace manager 108. The agents 112 may provide all generated span data to the trace manager 108 (e.g., without head-based sampling at the span level.)

The trace manager 108 receives the span data from the agents and provides tail-based sampling of the span data at the trace level. The trace manager 108 generates traces by grouping operations defined by the span data. For example, the trace identifier of operation may be used to associate the operation with a trace. The agents 112 may collect a large volume of span data, and thus the trace manager 108 may sample the span data by determining a selected subset of the traces and an unselected subset of the traces using trace criteria. The trace manager 108 provides selected span data of the selected subset of traces to the monitoring system 102 via the network 124. The trace manager 108 discards unselected span data of the unselected subset of traces, or otherwise does not provide the unselected span data to the monitoring system 102.

The trace manager 108 provides for tail-based sampling of the span data at the trace level and at a single point in the host system 104. The trace criteria define whether to keep or discard span data at the trace level (e.g., rather than the individual span level). Because the agents 112 provide all generated span data to the trace manager 108 without head-based sampling at the span level, the trace manager 108 can generate complete traces and compare trace characteristics of the complete traces with the trace criteria. The use of intelligent, tail-based sampling at the trace manager 108 can result in a more effective collection of span data for performance monitoring of the host system 104 than random, head-based sampling at each agent 112. To reduce operation costs associated transmitting high volumes span data generated by the agents 112 via the network 124 (e.g., the Internet), the trace manager 108 is in the host system 104 with the agents 112. The selected span data sampled by the trace manager 108 and transmitted to the monitoring system 102 via the network 124 is lower volume than all span data generated by the agents 112.

The trace criteria define rules for when a trace and associated span data is deemed interesting and thus worthy of sampling. Some examples of trace criteria may include a random trace selection, trace duration threshold, occurrence of trace error, and trace priority level threshold. The use of random trace selection includes determining the selected and unselected subsets of traces randomly. The use of trace duration threshold includes using a time threshold where traces having trace duration, as may be defined by execution time, that exceed the time threshold are selected for sampling. The use of occurrence of trace error includes detecting a trace error of interest in the traces. Traces with errors or error types of interest may be given higher priority for sampling. The use of trace priority level threshold includes comparing a priority level of a trace defining the importance of the trace with a threshold value, where important traces that exceed the trace priority level threshold are selected for sampling. In some embodiments, traces may be ranked using one or more trace characteristics, and the top-ranking traces may be selected for sampling. In some embodiments, machine learning or statistical learning techniques may be used to determine outlier traces with respect to one or more trace criteria, and the outlier traces may be selected for sampling.

In some embodiments, the trace manager 108 generates trace metrics using the unselected span data and the selected span data. For example, prior to discarding the unselected span data, the trace manager 108 uses all the span data collected from the agents 112 to generate the trace metrics. Some examples of trace metrics may include duration of the traces, whether a trace was sampled and why (error, duration outlier, random), entities or applications that participated in the trace, and the name of the first span (operation) in the underlying request. Metrics differ from the traces themselves because they represent 100% of the data seen with a few dimensions of information, at a much lower cost than keeping the entire data of the trace. The tail-based sampling approach allows for trace metrics to be generated from the complete collection of span data and every trace even though only a subset of the traces is kept for sampling purposes. Using a head-based sampling approach, it would not be possible to generate the trace metrics using the complete collection of span data because only sample subset of the span data generated by the agents 112 is transmitted to the trace manager 108.

In some embodiments, head-based sampling at an agent 112 may be used in connection with the tail-based sampling at the trace manager 108. For example, a subset of the agents 112 may sample span data randomly, and provide a random subset of generated span data to the trace manager 108. In another example, a subset of the agents 112 may drop spans for applications that are generating span data at more than a predefined rate (e.g., 1000 spans/minute rate). Additional details regarding the trace manager 108 are discussed in connection with FIG. 2.

The monitoring system 102 analyzes the span data received from the trace manager 108 to generate span analysis data. The monitoring system 102 may provide the span analysis data to a client device 116 (e.g., associated with an administrator of the host system 104), a client device 106, the host system 104, or some other computing device. For example, the monitoring system 102 may generate reports and provide user alerts based on the span analysis data. The report or alert may indicate that an application has executed abnormally and a reason for the abnormal execution. Additional details regarding the monitoring system 102 are discussed in connection with FIG. 3.

The client device 106 may be connected to an application 114 of the host system 104 to receive services, such as a web service, registration service, or account service. The client device 116 may be used by an operator of the host system 104 and/or the monitoring system 102. For example, the client device 116 may receive reports or alerts concerning the performance of an application 114 executing in the host system 104 from the monitoring system 102 via the network 124. In various embodiments, the client devices 106 or 116 may be a wired user device, such as a desktop computer, or a mobile user device, such as a laptop computer, a personal digital assistant (PDA), a mobile telephone, a smartphone, a tablet, or a wearable device. A client device 106 or 116 may include computing functionality and data communication capabilities for receiving user input as well as transmitting and/or receiving data via the network 124.

Figure 2:
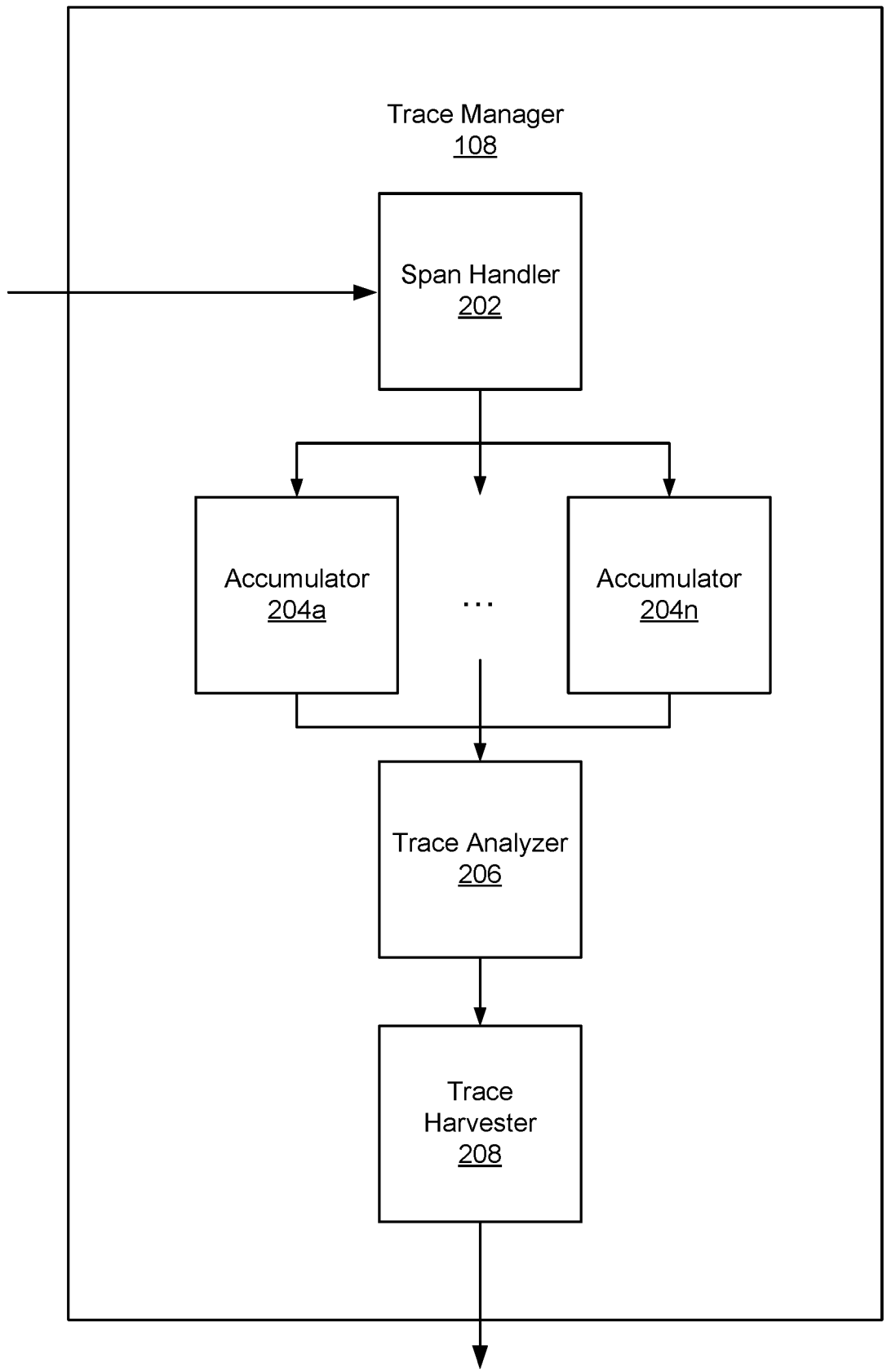
FIG. 2 is a block diagram illustrating a trace manager, according to one embodiment.

FIG. 2 is a block diagram illustrating a trace manager 108, according to one embodiment. The trace manager 108 includes a span handler 202, accumulators 204*a* through 204*n* (also referred to as accumulators 204), a trace analyzer 206, and a trace harvester 208.

The span handler 202 receives span data from the agents 112*a* through 112*n*, and routes spans to accumulators 204*a* through 204*n* according to the trace identifier of the operations.

The accumulators 204*a* through 204*n* collect span data into traces. Each of the accumulators 204 may handle a subset of the traces. The number of accumulators 204 may vary, such as based on the volume of span data collected by the agents 112. In some embodiments, the accumulators 204*a* through 204*n* may further generate trace index data defining the traces and trace characteristics of the traces. Some examples of trace characteristics that may be used to index the traces may include trace end time, trace start time, trace error, and trace name. The trace characteristics may also be compared with the one or more trace criteria for tail-based sampling. For example, the trace start and end times may be used to compare with the trace duration threshold.

The trace analyzer 206 perform the tail-based sampling by determining the selected subset of the traces and the unselected subset of the traces by comparing the trace characteristics with the trace criteria. The selected span data may be transmitted to the monitoring system 102. The trace analyzer 206 may further discard the unselected span data.

In some embodiments, the trace analyzer 206 may generate trace metrics using the unselected span data and the selected span data.

The trace harvester 208 sends the selected span data to the monitoring system 102. The trace harvester 208 may further send the trace metrics and the trace index data to the monitoring system 102. In some embodiments, the trace harvester 208 sends the span data and the trace index data to the monitoring system 102 via a trace application programming interface (API), and sends the trace metrics to the monitoring system 102 via a metrics API.

Figure 3:
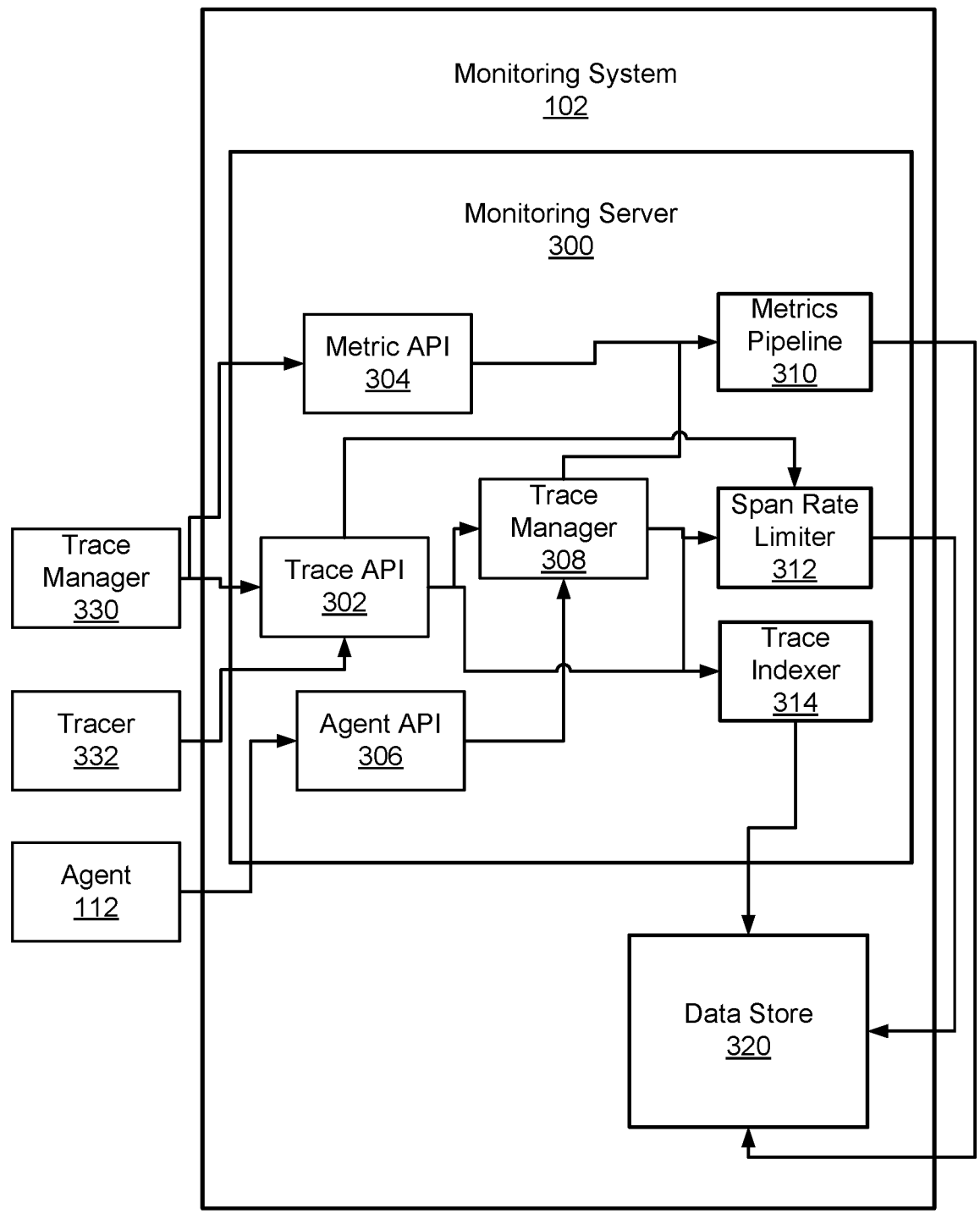
FIG. 3 is a block diagram illustrating a monitoring system, according to one embodiment.

FIG. 3 is a block diagram illustrating a monitoring system 102 that monitors host system 104, according to one embodiment. The monitoring system 102 includes one or more monitoring servers 300 and one or more data stores 320.

The monitoring server 300 monitors performance of the host system 104 and applications 114a through 114n by communicating with the trace manager 108 via the network 124. The monitoring server 300 receives the span data from the trace manager 108, analyzes the span data to generate span analysis data, and generates reports and alerts based on the span analysis data. The monitoring server 300 may generate the span analysis data by comparing the span data with span data parameters defining thresholds for normal functionality.

The monitoring server 300 may provide a report or alert of the event loop analysis data to a user interface of the client device 116 for view and analysis by an administrator of the host system 104. The report and alert enable the administrator to address any performance issues in the host system 104, application 114, or client device 106. The monitoring server 300 may provide an alert when an application 114 is determined to be performing abnormally, such as to a client device 116. In some embodiments, the monitoring server 300 may facilitate programmatic remedial actions when an application 114 is determined to be operating abnormally. For example, an application 114 may be shut down or restarted.

In some embodiments, the monitoring server 300 includes a metrics API 302, a trace API 304, an agent API 306, a trace manager 308, a metrics pipeline 310, a span rate limiter 312, and a trace indexer 314. These components facilitate the collection of span data and related information from various sources outside the monitoring system 102 and storage of the span data in the data store 320.

The trace API 302 provides an interface for receiving span data and trace index data from outside the monitoring system 102. The trace API 302 is connected to a trace manager 330 to receive the span data and the trace index data. The trace manager 330 may receive span data from agents 112 or open instrumentation tracers. The trace manager 330 may be an example of the trace manager 108 that is on-premise of the host system 104, or may be a cloud-premise trace manager that is managed by the monitoring system 102. The trace manager 330 performs tail-based sampling of the span data prior to providing the span data to the trace API 302. The trace API 302 provides the span data from the trace manager 330 to the span rate limiter 312 and the trace index data to the trace indexer 314. The trace API 302 further receives raw (e.g., not sampled) span data from the tracer 332 and provides the raw span data to the trace manager 308 for tail-based sampling.

The metric API 304 provides an interface for receiving trace metrics from outside the monitoring system 102. The metric API 304 receives trace metrics from the trace manager 330 and provides the trace metrics to the metrics pipeline 310.

The agent API 306 provides an interface for receiving raw span data from outside the monitoring system 102. The agent API 306 receives the raw span data from agents 112 and provides the raw span data to the trace manager 308.

The trace manager 308 provides tail-based sampling of raw span data received by the monitoring system 102. The trace manager 308 is receives raw span data from open instrumentation tracers via the trace API 302 and agents 112 via the agent API 306. The trace manager 308 uses the raw span data to generate sampled span data, trace metrics, and trace index data. The trace manager 308 provides the sampled span data to the span rate limiter 312, the trace metrics to the metrics pipeline 310, and the trace index data to the trace indexer 314.

The span rate limiter 312 receives sampled span data and provides the sampled span data to the data store 320. The metrics pipeline 310 receives trace metrics and provides the trace metrics to the data store 320. The trace indexer 314 receives the trace index data and provides the trace index data to the data store 320.

The data store 320 is connected to each of the metrics pipeline 310, span rate limiter 312, and trace indexer 314. The data store 320 receives and stores the span data, span analysis data, trace metrics, trace index records, and other data used by the monitoring system 102. The data store 320 may also provide the stored span data, span analysis data, trace metrics, trace index records, and other data to the monitoring server 300. For example, the data store 320 may provide the span data, trace metrics, and trace index records to the monitoring server 300 to facilitate creation of the span analysis data.

Figure 4:
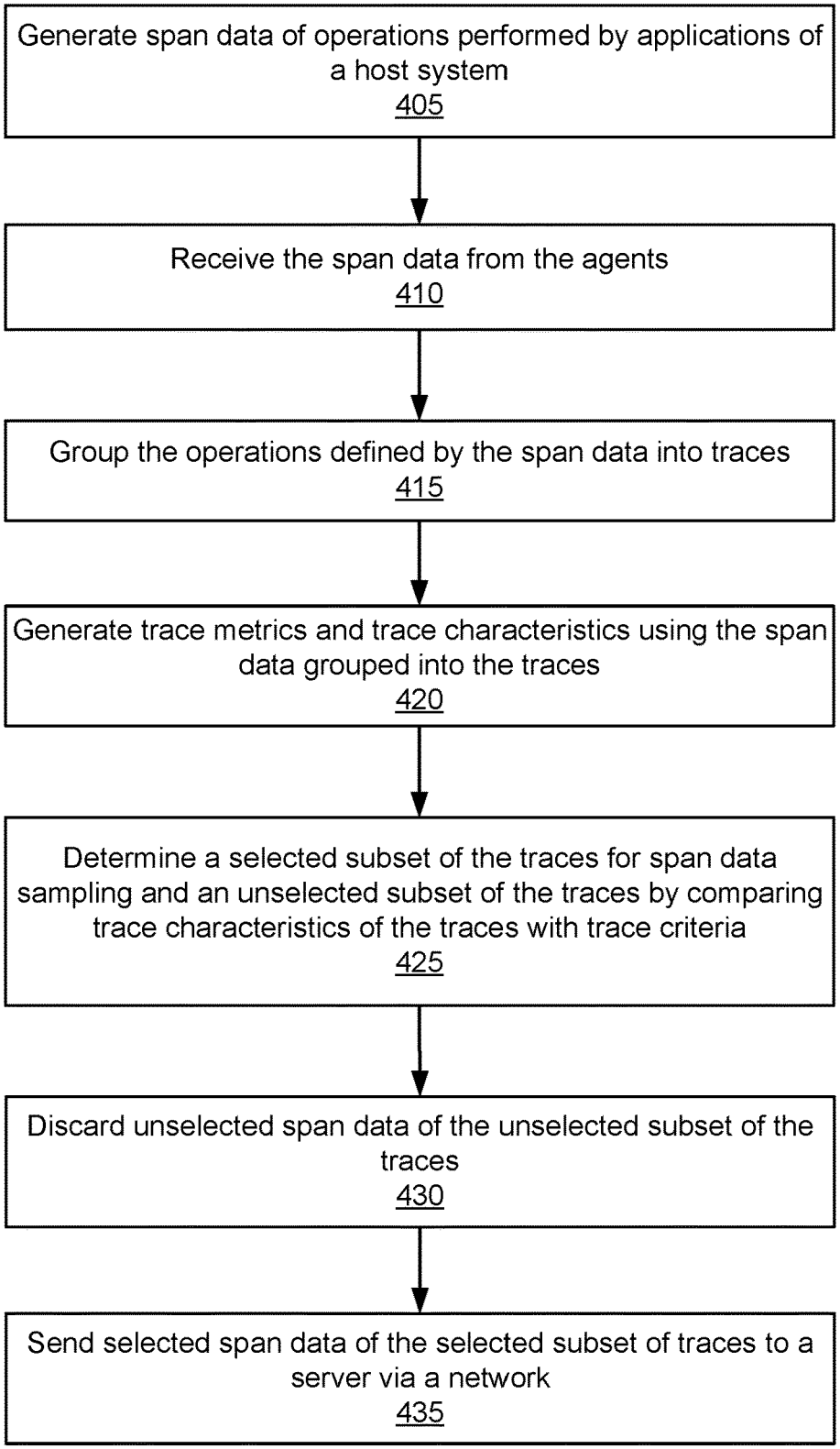
FIG. 4 is a flow chart illustrating a process for tail-based sampling of span data at the trace level, according to one embodiment.

FIG. 4 is a flow chart illustrating a process 400 for tail-based sampling of span data at the trace level, according to one embodiment. The process 400 is discussed as being performed by the computing systems shown in FIGS. 1, 2, and 3, but other types of computing systems or devices may be used. The process 400 may include fewer or additional steps, and steps may be performed in different orders.

Agents of a host system generate 405 span data of operations performed by applications of the host system. The agents do not perform a head-based sampling of the span data, and thus the span data received by the trace manager from the agents may include all span data generated by the agents.

A trace manager of the host system receives 410 the span data from the agents. The trace manager may be located in the host system with the agents to reduce the volume of span data that is transmitted outside of the host system, such as via the Internet.

The trace manager groups 415 the operations defined by the span data into traces. For example, the span data may include a trace identifier for each operation and the operations are grouped into the traces using the trace identifier of each operation. In some embodiments, the trace manager includes a plurality of accumulators executing in parallel. Each accumulator is dedicated to a portion of the traces and groups the span data for a respective portion of the traces.

The trace manager generates 420 trace metrics and trace characteristics using the span data grouped into the traces. The trace metrics may include information aggregated from span data at the trace level. The trace metrics may be generated using all the span data received from the agents rather than only sampled portions. The trace characteristics may be used to index the span data and for tail-based sampling purposes. Some examples of trace characteristics that may include trace end time, trace start time, trace error, and trace name The trace manager determines 425 a selected subset of the traces for span data sampling and an unselected subset of the traces excluded from the span data sampling by comparing one or more trace characteristics of the traces with one or more trace criteria. The trace manager performs a tail-based sampling of the span data by the trace characteristics for complete traces of the span data. In some embodiments, the one or more trace characteristics include a trace duration and the one or more trace criteria include a trace duration threshold. In some embodiments, the one or more trace characteristics include trace error and the one or more trace criteria include an occurrence of trace error. In some embodiments, the one or more trace characteristics include a trace priority level and the one or more trace criteria include a trace priority level threshold. In some embodiments, a random trace selection may be used to select the traces for span data sampling. In some embodiments, traces may be ranked using one or more trace characteristics, and the top-ranking traces may be selected for sampling.

The trace manager discards 430 unselected span data of the unselected subset of traces. Discarding the unselected span data from the tail-based sampling frees up storage resources at the trace manager and reduces the volume of span data that is transmitted to the monitoring system via the Internet.

The trace manager provides 435 selected span data of the selected subset of the traces to a server via a network. The server may be the monitoring server of the monitoring system. The monitoring system may use the selected span data to monitor performance of the applications executing in the host system. The network may include a wide area network, such as the Internet.

Figure 5:
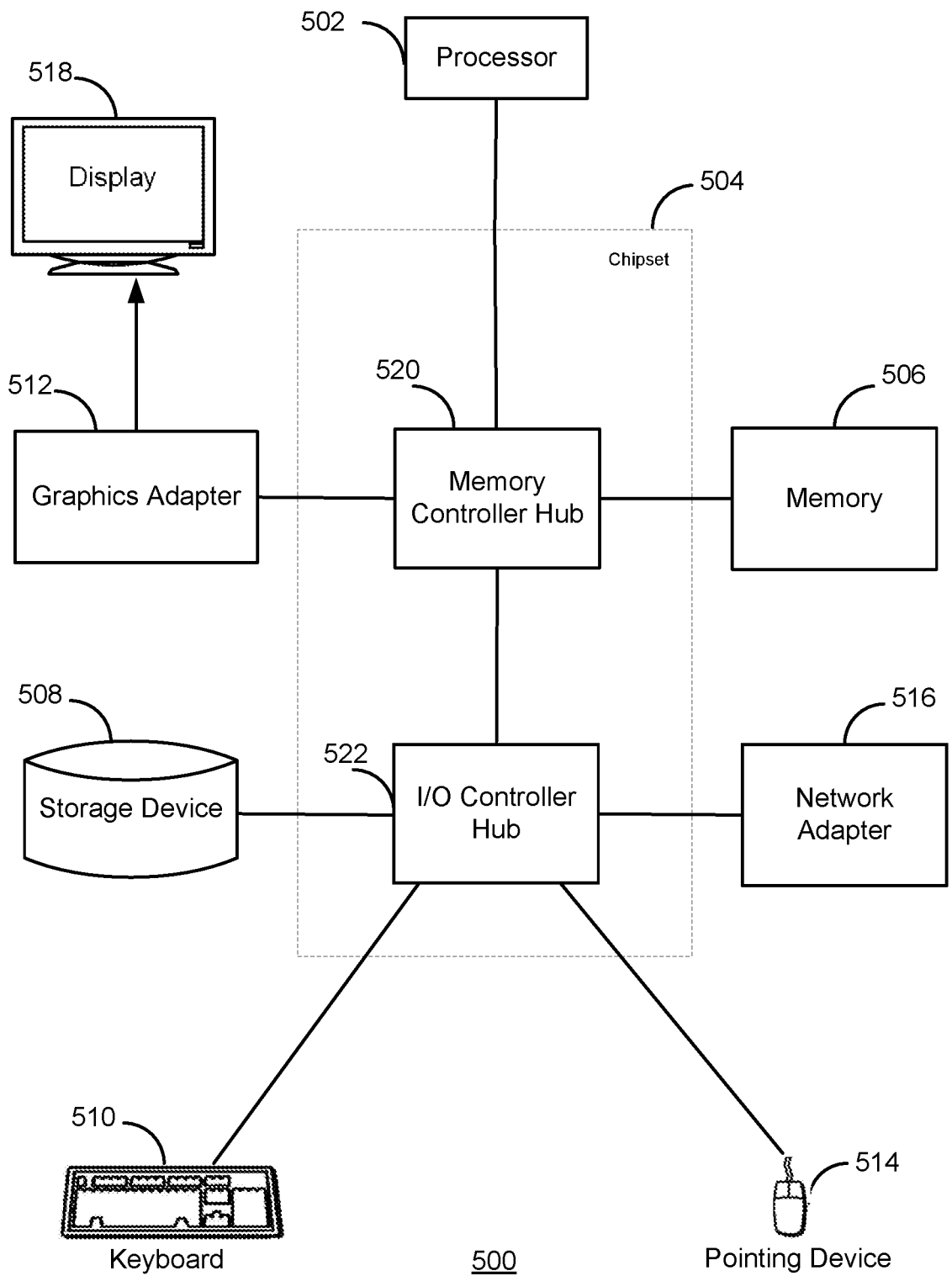
FIG. 5 is a block diagram illustrating an example of a computer, according to one embodiment.

FIG. 5 is a high-level block diagram illustrating an example of a computer 500, according to one embodiment. The computer 500 is an example of circuitry that implements components of the monitoring system 102, host system 104, client device 106, or client device 116. Illustrated are at least one processor 502 coupled to a chipset 504. The chipset 504 includes a memory controller hub 520 and an input/output (I/O) controller hub 522. A memory 506 and a graphics adapter 512 are coupled to the memory controller hub 520, and a display device 518 is coupled to the graphics adapter 512. A storage device 508, keyboard 510, pointing device 514, and network adapter 516 are coupled to the I/O controller hub 522. Other embodiments of the computer 500 have different architectures. For example, the memory 506 is directly coupled to the processor 502 in some embodiments.

The storage device 508 includes one or more non-transitory computer-readable storage media such as a hard drive, compact disk read-only memory (CD-ROM), DVD, or a solid-state memory device. The memory 506 holds instructions and data used by the processor 502. The pointing device 514 is used in combination with the keyboard 510 to input data into the computer system 500. The graphics adapter 512 displays images and other information on the display device 518. In some embodiments, the display device 518 includes a touch screen capability for receiving user input and selections. The network adapter 516 couples the computer system 500 to the network 124. Some embodiments of the computer 500 have different and/or other components than those shown in FIG. 5.

The computer 500 is adapted to execute computer program modules for providing functionality described herein.

For example, some embodiments may include a computing device including one or more modules configured to perform the process 400 shown in FIG. 4. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 508, loaded into the memory 506, and executed by the processor 502.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments of the disclosure is intended to be illustrative, but not limiting, of the scope of the invention.

What is claimed is:

1. A method for sampling span data, comprising, by a circuitry:

receiving, from agents of a host system, span data of operations performed by applications executed by the host system;

grouping the operations defined by the span data into traces;

determining a selected subset of the traces for span data sampling and an unselected subset of the traces excluded from the span data sampling according to a plurality of trace criteria, including by randomly selecting traces and including by comparing one or more trace characteristics of the traces with one or more trace criteria in the plurality of trace criteria, wherein:
- the one or more trace characteristics include one or more of a trace duration, a trace error, or a trace priority level;
- the one or more trace criteria compared to the one or more trace characteristics include one or more of a trace duration threshold, an occurrence of a trace error, or a trace priority level;
- the selected subset of traces includes the randomly selected traces and one or more traces selected for: having a trace duration that exceeds the trace duration threshold, having an occurrence of trace error of interest or error type of interest, or having a trace priority level that exceed the trace priority level threshold;

prior to discarding unselected span data of the unselected subset of the traces, generating trace metrics using the unselected span data of the unselected subset of the traces and the selected span data of the selected subset of the traces, the trace metrics identifying the unselected subset of the traces, the selected subset of the traces, and a reasoning associated with each of the unselected subset of the traces and the selected subset of the traces, the reasoning indicating at least one of: random, duration, error, or priority; and after generating the trace metrics, discarding the unselected span data of the unselected subset of the traces.

2. The method of claim 1, further comprising, by the circuitry, providing selected span data of the selected subset of the traces to a server via a network.

3. The method of claim 1, wherein the span data received from the agents includes all span data generated by the agents.

4. The method of claim 1, wherein the applications include a web service, a registration service, and an account service.

5. The method of claim 1, wherein the circuitry includes a plurality of accumulators that group the span data for the traces in parallel.

6. The method of claim 1, wherein the span data includes a trace identifier for each operation and the operations are grouped into the traces using the trace identifier of each operation.

7. A system for sampling span data, comprising:
a circuitry configured to:
  execute applications and agents, the agents configured to generate the span data of operations performed by the applications; and
  execute a trace manager configured to:
    receive the span data from the agents;
    group the operations defined by the span data into traces;
    determine a selected subset of the traces for span data sampling and an unselected subset of the traces excluded from the span data sampling according to a plurality of trace criteria, including by randomly selecting traces and including by comparing one or more trace characteristics of the traces with one or more trace criteria in the plurality of trace criteria, wherein:
      - the one or more trace characteristics include one or more of a trace duration, a trace error, or a trace priority level;
      - the one or more trace criteria compared to the one or more trace characteristics include one or more of a trace duration threshold, an occurrence of a trace error, or a trace priority level;
      - the selected subset of traces includes the randomly selected traces and one or more traces selected for: having a trace duration that exceeds the trade duration threshold, having an occurrence of trace error of interest or error type of interest, or having a trace priority level that exceeds the trace priority level threshold;

prior to discarding unselected span data of the unselected subset of the traces, generate trace metrics using the unselected span data of the unselected subset of the traces and the selected span data of the selected subset of the traces, the trace metrics identifying the unselected subset of the traces, the selected subset of the traces, and a reasoning associated with each of the unselected subset of the traces and the selected subset of the traces, the reasoning indicating at least one of: random, duration, error, or priority, and after generating the trace metrics, discard the unselected span data of the unselected subset of the traces.

8. The system of claim 7, wherein the trace manager is further configured to provide selected span data of the selected subset of the traces to a server via a network.

9. The system of claim 7, wherein the span data received by the trace manager from the agents includes all span data generated by the agents.

10. The system of claim 7, wherein the trace manager includes a plurality of accumulators executing in parallel, each accumulator configured to group the span data for a portion of the traces.

11. The system of claim 7, wherein the span data includes a trace identifier for each operation and the operations are grouped into the traces using the trace identifier of each operation.

12. A non-transitory computer readable storage medium having instructions encoded thereon that, when executed by a processor, configures the processor to:
  receive, from agents of a host system, span data of operations performed by applications executed by the host system;
  group the operations defined by the span data into traces;
  determine a selected subset of the traces for span data sampling and an unselected subset of the traces excluded from the span data sampling according to a plurality of trace criteria, including by randomly selecting traces and including by comparing one or more trace characteristics of the traces with one or more trace criteria in the plurality of trace criteria, wherein:
    - the one or more trace characteristics include one or more of a trace duration, a trace error, or a trace priority level;
    - the one or more trace criteria compared to the one or more trace characteristics include one or more of a trace duration threshold, an occurrence of trace error, or a trace priority level;
    - the selected subset of traces includes the randomly selected traces and one or more traces selected for: having a trace duration that exceeds the trace duration threshold, having an occurrence of trace error of interest or error type of interest, or having a trace priority level that exceeds the trace priority level threshold;

prior to discarding unselected span data of the unselected subset of the traces, generate trace metrics using the unselected span data of the unselected subset of the traces and the selected span data of the selected subset of the traces, the trace metrics identifying the unselected subset of the traces, the selected subset of the traces, and a reasoning associated with each of the unselected subset of the traces and the selected subset of the traces, the reasoning indicating at least one of: random, duration, error, or priority; and after generating the trace metrics, discard the unselected span data of the unselected subset of the traces.

* * * * *